US008565116B2

(12) United States Patent
Bamba

(10) Patent No.: US 8,565,116 B2
(45) Date of Patent: Oct. 22, 2013

(54) COMMUNICATION APPARATUS AND PROTOCOL PROCESSING METHOD

(75) Inventor: Masakazu Bamba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 200 days.

(21) Appl. No.: 11/984,216

(22) Filed: Nov. 14, 2007

(65) Prior Publication Data
US 2008/0151783 A1    Jun. 26, 2008

(30) Foreign Application Priority Data

Dec. 26, 2006  (JP) ................................ 2006-349993

(51) Int. Cl.
H04L 12/28    (2006.01)

(52) U.S. Cl.
USPC .......................................................... 370/254

(58) Field of Classification Search
USPC ................... 370/254–256, 408; 709/223–226
See application file for complete search history.

(56) References Cited

U.S. PATENT DOCUMENTS

| 6,895,441 | B1 * | 5/2005 | Shabtay et al. | 709/238 |
| 7,248,561 | B2 | 7/2007 | Ishibashi et al. | |
| 2003/0189920 | A1 * | 10/2003 | Erami et al. | 370/351 |
| 2007/0019954 | A1 * | 1/2007 | Lu et al. | 398/51 |
| 2007/0230359 | A1 | 10/2007 | Tanaka | |
| 2010/0098416 | A1 * | 4/2010 | Zhao et al. | 398/45 |
| 2010/0296508 | A1 * | 11/2010 | Lewis | 370/352 |

FOREIGN PATENT DOCUMENTS

| JP | 2003-229889 | 8/2003 |
| JP | 2003-234824 | 8/2003 |
| JP | 2006-60337 | 3/2006 |
| JP | 2006-99209 | 4/2006 |
| JP | 2006-135945 | 5/2006 |

OTHER PUBLICATIONS

Japanese Office Action issued Feb. 15, 2011 in corresponding Japanese Patent Application 2006-349993.
Coltun, R. "The OSPF Opaque LSA Option", Jul. 1998.
Kompella, K. et al., "OSPF Extensions in Support of Generalized Multi-Protocol Label Switching (GMPLS)", Oct. 2005.
Kompella, K. et al., Routing Extensions in Support of Generalized Multi-Protocol Label Switching (GMPLS), Oct. 2005.
Katz, D. et al., "Traffic Engineering (TE) Extensions to OSPF Version 2", Sep. 2003.

* cited by examiner

Primary Examiner — Dang Ton
Assistant Examiner — Kevin Lee
(74) Attorney, Agent, or Firm — Staas & Halsey LLP

(57) ABSTRACT

A disclosed communication apparatus includes a protocol processing unit configured to send and receive link information on a link in a network having a redundant configuration according to a protocol, to build topology information of the network from the link information, and to set up a path in the network based on the topology information. The protocol processing unit includes a link information advertising unit configured to advertise the link information including, for each of protection types of the link, information used to set up the path, a topology information storing unit configured to store the topology information, and a link information receiving unit configured to receive the link information and to store the received link information in the topology information storing unit.

14 Claims, 16 Drawing Sheets

FIG.3
```
0x01  Extra Traffic
0x02  Unprotected
0x04  Shared
0x08  Dedicated 1:1
0x10  Dedicated 1+1
0x20  Enhanced
0x40  Reserved
0x80  Reserved
```

FIG.5

| UPSTREAM NODE | DOWNSTREAM NODE | PROTECTION TYPE | RESERVABLE BANDWIDTH |
|---|---|---|---|
| A | B | UNPROTECTED | 8ch |
| A | M | UNPROTECTED | 10ch |
| B | A | UNPROTECTED | 8ch |
| B | C | ENHANCED | 12ch |
| B | E | ENHANCED | 36ch |
| C | B | ENHANCED | 12ch |
| C | D | ENHANCED | 12ch |
| D | C | ENHANCED | 12ch |
| D | E | ENHANCED | 36ch |
| D | Z | UNPROTECTED | 96ch |
| E | B | ENHANCED | 36ch |
| E | D | ENHANCED | 36ch |
| M | A | UNPROTECTED | 10ch |
| M | Z | UNPROTECTED | 6ch |
| Z | D | UNPROTECTED | 36ch |
| Z | M | UNPROTECTED | 6ch |

FIG.7

| UPSTREAM NODE | DOWN-STREAM NODE | PROTECTION TYPE | RESERVABLE BANDWIDTH | CHANNEL AVAILABILITY INFORMATION |
|---|---|---|---|---|
| A | B | UNPROTECTED | 8ch | - |
| A | M | UNPROTECTED | 10ch | - |
| B | A | UNPROTECTED | 8ch | - |
| B | C | ENHANCED | 12ch | - |
| B | C | ENHANCED | STS1-12ch | - |
| B | C | ENHANCED | STS3C-3ch | - |
| B | C | ENHANCED | STS12C-0ch | - |
| B | C | UNPROTECTED | STS1-20ch | - |
| B | C | UNPROTECTED | STS3C-6ch | - |
| B | C | UNPROTECTED | STS12C-1ch | - |
| B | C | EXTRA | STS1-4ch | - |
| B | C | EXTRA | STS3C-1ch | - |
| B | C | EXTRA | STS12C-0ch | - |
| B | C | - | - | 000..1010..111 |
| B | E | ENHANCED | 16ch | |
| B | E | ENHANCED | STS1-16ch | - |
| B | E | ENHANCED | STS3C-3ch | - |
| B | E | ENHANCED | STS12C-1ch | - |
| B | E | UNPROTECTED | STS1-20ch | - |
| B | E | UNPROTECTED | STS3C-6ch | - |
| B | E | UNPROTECTED | STS12C-1ch | - |
| B | E | EXTRA | STS1-4ch | - |
| B | E | EXTRA | STS3C-1ch | - |
| B | E | EXTRA | STS12C-0ch | - |
| B | E | - | - | 000..1111..111 |
| C | B | ENHANCED | 12ch | |
| C | B | ENHANCED | STS1-12ch | - |
| C | B | ENHANCED | STS3C-2ch | - |
| C | B | ENHANCED | STS12C-0ch | - |
| C | B | UNPROTECTED | STS1-20ch | - |
| C | B | UNPROTECTED | STS3C-6ch | - |
| C | B | UNPROTECTED | STS12C-1ch | - |
| C | B | EXTRA | STS1-4ch | - |
| C | B | EXTRA | STS3C-1ch | - |
| C | B | EXTRA | STS12C-0ch | - |
| C | B | - | - | 000..1100..101 |
| C | D | ENHANCED | 12ch | |
| C | D | ENHANCED | STS1-12ch | - |
| C | D | ENHANCED | STS3C-4ch | - |
| C | D | ENHANCED | STS12C-1ch | - |
| C | D | UNPROTECTED | STS1-20ch | - |
| C | D | UNPROTECTED | STS3C-6ch | - |
| C | D | UNPROTECTED | STS12C-1ch | - |
| C | D | EXTRA | STS1-4ch | - |
| C | D | EXTRA | STS3C-1ch | - |
| C | D | EXTRA | STS12C-0ch | - |
| C | D | - | - | 000..0011..101 |

FIG.8

| UPSTREAM NODE | DOWN-STREAM NODE | PROTECTION TYPE | RESERVABLE BANDWIDTH | CHANNEL AVAILABILITY INFORMATION |
|---|---|---|---|---|
| D | C | ENHANCED | 12ch | |
| D | C | ENHANCED | STS1-12ch | – |
| D | C | ENHANCED | STS3C-4ch | – |
| D | C | ENHANCED | STS12C-1ch | – |
| D | C | UNPROTECTED | STS1-20ch | – |
| D | C | UNPROTECTED | STS3C-6ch | – |
| D | C | UNPROTECTED | STS12C-1ch | – |
| D | C | EXTRA | STS1-4ch | – |
| D | C | EXTRA | STS3C-1ch | – |
| D | C | EXTRA | STS12C-0ch | – |
| D | C | – | – | 000..1100..101 |
| D | E | ENHANCED | 16ch | |
| D | E | ENHANCED | STS1-16ch | – |
| D | E | ENHANCED | STS3C-5ch | – |
| D | E | ENHANCED | STS12C-1ch | – |
| D | E | UNPROTECTED | STS1-20ch | – |
| D | E | UNPROTECTED | STS3C-6ch | – |
| D | E | UNPROTECTED | STS12C-1ch | – |
| D | E | EXTRA | STS1-4ch | – |
| D | E | EXTRA | STS3C-1ch | – |
| D | E | EXTRA | STS12C-0ch | – |
| D | E | – | – | 000..0011..101 |
| D | Z | UNPROTECTED | 96ch | |
| E | B | ENHANCED | 16ch | |
| E | B | ENHANCED | STS1-16ch | – |
| E | B | ENHANCED | STS3C-3ch | – |
| E | B | ENHANCED | STS12C-1ch | – |
| E | B | UNPROTECTED | STS1-20ch | – |
| E | B | UNPROTECTED | STS3C-6ch | – |
| E | B | UNPROTECTED | STS12C-1ch | – |
| E | B | EXTRA | STS1-4ch | – |
| E | B | EXTRA | STS3C-1ch | – |
| E | B | EXTRA | STS12C-0ch | – |
| E | B | – | – | 000..0011..111 |
| E | D | ENHANCED | 16ch | |
| E | D | ENHANCED | STS1-16ch | – |
| E | D | ENHANCED | STS3C-5ch | – |
| E | D | ENHANCED | STS12C-1ch | – |
| E | D | UNPROTECTED | STS1-20ch | – |
| E | D | UNPROTECTED | STS3C-6ch | – |
| E | D | UNPROTECTED | STS12C-1ch | – |
| E | D | EXTRA | STS1-4ch | – |
| E | D | EXTRA | STS3C-1ch | – |
| E | D | EXTRA | STS12C-0ch | – |
| E | D | – | – | 000..0011..111 |
| M | A | UNPROTECTED | 10ch | |
| M | Z | UNPROTECTED | 6ch | |
| Z | D | UNPROTECTED | 36ch | |
| Z | M | UNPROTECTED | 6ch | |

COMMUNICATION APPARATUS AND PROTOCOL PROCESSING METHOD

CROSS-REFERENCE TO RELATED APPLICATIONS

The present application is based upon and claims the benefit of priority from the prior Japanese Patent Application No. 2006-349993 filed on Dec. 26, 2006, with the Japanese Patent Office, the entire contents of which are incorporated herein by reference.

BACKGROUND OF THE INVENTION

1. Field of the Invention

The present invention generally relates to technologies for sending and receiving network topology information including redundancy information between nodes using a routing protocol for generalized multiprotocol label switching (GMPLS).

2. Description of the Related Art

A technology called multiprotocol label switching (MPLS), in which IP packets are routed based on labels, has become widely used. Also, a technology called generalized multiprotocol label switching (GMPLS) is drawing attention. In GMPLS, the idea of "labels" used for routing IP packets in MPLS is generalized and adapted for other networking technologies such as time division multiplexing (TDM) and wavelength division multiplexing (WDM) (i.e. TDM layer and wavelength path layer).

In MPLS and GMPLS, a label switched path (LSP) indicating a path or a route in a network is set up by referring to a label table. Normally, in MPLS and GMPLS, a source node calculates a route to a destination node and sets up an LSP for the calculated route using a signaling protocol such as the resource reservation protocol-traffic engineering (RSVP-TE).

Route calculation in MPLS and GMPLS is performed based on network topology information obtained by nodes using a routing protocol such as the open shortest path first-traffic engineering (OSPF-TE). OSPF-TE is used for traffic engineering in MPLS and is developed by extending OSPF used for IP networks. Also, extensions to OSPF-TE used for GMPLS are defined in RFC 4203.

In OSPF-TE, each node advertises link information retained in itself to other nodes by opaque link state advertisement (opaque LSA; RFC 2370 and RFC 3630), and each node creates a topology information database of the entire network based on link information from other nodes. In opaque LSA, link information is advertised in a format called TLV (type/length/value). There are generally two types of TLVs: the router address TLV and the link TLV. In the present application, the link TLV is mainly discussed. A link TLV may include sub-TLVs (RFC 3630 and RFC 4203) (sub-TLVs may also be called sub-frames in the present application). FIG. 1 is a drawing illustrating a format of a TLV (RFC 3630). FIG. 2 is a drawing illustrating a TLV including sub-TLVs.

There are 16 types of sub-TLVs: types 1 through 9 for traffic engineering in MPLS (RFC 3630), and types 11 through 16 for GMPLS (RFC 4203).

Of the 16 types of sub-TLVs, sub-TLV type 7 (may also be called a reservable bandwidth sub-frame) is assigned to "Maximum Reservable Bandwidth" and is used to advertise a maximum reservable bandwidth (reservable bandwidth information) of a link to other nodes. Sub-TLV type 14 (may also be called a protection type sub-frame) is assigned to "Link Protection Type" and is used to advertise the reliability of a link. Sub-TLV type 14 contains one of the values as shown in FIG. 3 (RFC 4203).

Meanings of some of the values are described below. Explanations of other values can also be found in RFC 4202. 0x01 Extra Traffic means that the link is protecting another link or links. LSPs on a link of this type will be lost if any of the links it is protecting fails. 0x02 Unprotected means that there is no other link protecting this link. LSPs on a link of this type will be lost if the link fails. 0x20 Enhanced means that there are two or more dedicated disjoint links for protecting this link. For example, it indicates that a 4-fiber bidirectional line switched ring (4-fiber BLSR) is being used to protect this link. Patent document 1 discloses a technology for setting up a path according to GMPLS.

[Patent document 1] Japanese Patent Application Publication No. 2006-135945

[Non-patent document 1] RFC2370, The OSPF Opaque LSA Option, July 1998

[Non-patent document 2] RFC3630, Traffic Engineering (TE) Extensions to OSPF Version 2, September 2003

[Non-patent document 3] RFC4202, Routing Extensions in Support of Generalized Multi-protocol Label Switching (GMPLS), October 2005

[Non-patent document 4] RFC4203, OSPF Extensions in Support of Generalized Multi-protocol Label Switching (GMPLS), October 2005

As described above, a sub-TLV for advertising reliability of a link is defined in OSPF-TE for GMPLS. However, there is one problem in using a synchronous optical network/synchronous digital hierarchy (SONET/SDH) path in a BLSR as a link for setting up an LSP. In the descriptions below, a SONET/SDH path is called a "line" to distinguish it from a path (LSP) set up on a link (TE link).

In a BLSR, a SONET/SDH line may be used as a normal line, a protection channel access (PCA) line, or a non-preemptible unprotected traffic (NUT) line. A normal line has a backup line and if the normal line fails, traffic is switched to the backup line. A PCA line is used as a backup line. When an active line being protected by the PCA line fails, the traffic currently flowing through the PCA line is stopped. A NUT line is an active line having no backup line. When the NUT line fails, the traffic flowing through the NUT line is lost.

When using a SONET/SDH line in a BLSR as a link for an LSP, for example, a normal line corresponds to an "Enhanced" link defined by RFC 4202, a PCA line corresponds to an "Extra Traffic" link, and a NUT line corresponds to an "Unprotected" link.

Multiple SONET/SDH lines can be set up in a link between nodes, and each of the SONET/SDH lines may be assigned to a normal line, a PCA line, or a NUT line of a BLSR. With the current routing protocol standards for GMPLS, however, it is not possible to advertise the protection type regarding redundancy for each of the SONET/SDH lines in a link.

FIG. 4 is a drawing illustrating an exemplary network including a BLSR. In the exemplary network shown in FIG. 4, a BLSR is formed by a ring connecting nodes B, D, D, and E. No backup lines are provided for lines (links) between nodes A and B, nodes A and M, nodes M and Z, and nodes Z and D. Texts provided on the lines between nodes indicate their bandwidths.

FIG. 5 is a table showing exemplary topology information retained in each node according to the current OSPF-TE. The exemplary topology information includes only parameters necessary for the descriptions given below.

With the current OSPF-TE, as described above, each node can advertise only one protection type and one type of reservable bandwidth information for each link. Therefore, as shown in FIG. 5, the exemplary topology information includes only one protection type and one type of reservable bandwidth information for each link. For example, the exemplary topology information includes only a protection type "Enhanced" and reservable bandwidth information "12ch" (which indicates 12 channels are available) for the link between nodes B and C. In the present application, a "channel" indicates the smallest unit of bandwidth of a SONET/SDH line.

In the network shown in FIG. 4, it is possible to set up an LSP having high reliability by referring to the connection information, the protection types, and the reservable bandwidth information shown in FIG. 5. For example, when setting up an LSP from node A to node Z, an LSP A-B-C-D-Z or A-B-E-D-Z, which goes through the BLSR, may be selected according to the topology information shown in FIG. 5.

However, with the topology information shown in FIG. 5, for example, it is not possible to set up a low-cost LSP using PCA lines since only one protection type is provided for each link. Also, although it is necessary to use the same type of synchronous transport signal (STS) channels of SONET (or the same type of synchronous transport module (STM) channels of SDH) when setting up an LSP on normal lines in a BLSR, it is not possible to advertise STS (or STM) channel information with the current GMPLS standards. In other words, a node cannot distinguish types of STS channels in a link when calculating a route to set up an LSP. Therefore, with the current OSPF-TE or the MPLS/GMPLS standards, it is not possible to select the same type of STS channels for an LSP to be set up on normal lines at the route calculation stage, and it is only possible to select the same type of STS channels when setting up the LSP by using a signaling protocol.

The above problem may be solved by defining an original TLV having a proprietary type number and by advertising redundancy information using the original TLV. However, if the proprietary type number is assigned to a new TLV type in a standard in the future, the original TLV becomes unusable. If different types of TLVs are assigned to the same type number, it causes a malfunction of a network apparatus. Therefore, defining an original TLV is not an appropriate way to solve the problem.

The above problem applies not only to a case where an LSP is set up in a network including a BLSR but also to a case where an LSP is set up in a network having any type of redundant configuration.

SUMMARY OF THE INVENTION

Embodiments of the present invention provide protocol technologies for sending and receiving network topology information including redundancy information that solve or reduce one or more problems caused by the limitations and disadvantages of the related art.

An embodiment of the present invention provides a communication apparatus including a protocol processing unit configured to send and receive link information on a link in a network having a redundant configuration according to a protocol, to build topology information of the network from the link information, and to set up a path in the network based on the topology information. The protocol processing unit includes a link information advertising unit configured to advertise the link information including, for each of protection types of the link, information used to set up the path, a topology information storing unit configured to store the topology information, and a link information receiving unit configured to receive the link information and to store the received link information in the topology information storing unit.

Another embodiment of the present invention provides a method of sending and receiving link information on a link in a network having a redundant configuration according to a protocol, where the link information is used to build topology information of the network and the topology information is used to set up a path in the network. The method includes a link information advertising step of advertising the link information including, for each of protection types of the link, information used to set up the path; and a link information receiving step of receiving the link information and storing the received link information to build the topology information.

BRIEF DESCRIPTION OF THE DRAWINGS

FIG. 3 shows values specified in a sub-TLV type 14;
FIG. 5 is a table showing exemplary topology information obtained by and retained in each node according to the current OSPF-TE;
FIG. 7 is a table showing a part of exemplary topology information stored in a topology information database 24 of the communication apparatus 10;
FIG. 8 is a table showing the remaining part of the exemplary topology information stored in the topology information database 24 of the communication apparatus 10.

DETAILED DESCRIPTION OF THE PREFERRED EMBODIMENTS

Preferred embodiments of the present invention are described below with reference to the accompanying drawings. The exemplary network shown in FIG. 4 is used in the descriptions below.

Figure 1:
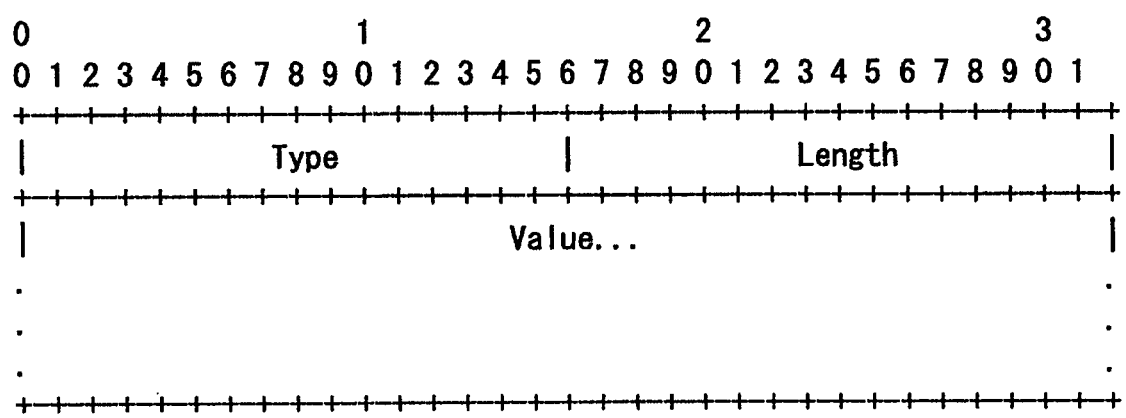
FIG. 1 is a drawing illustrating a format of a TLV.
Figure 2:
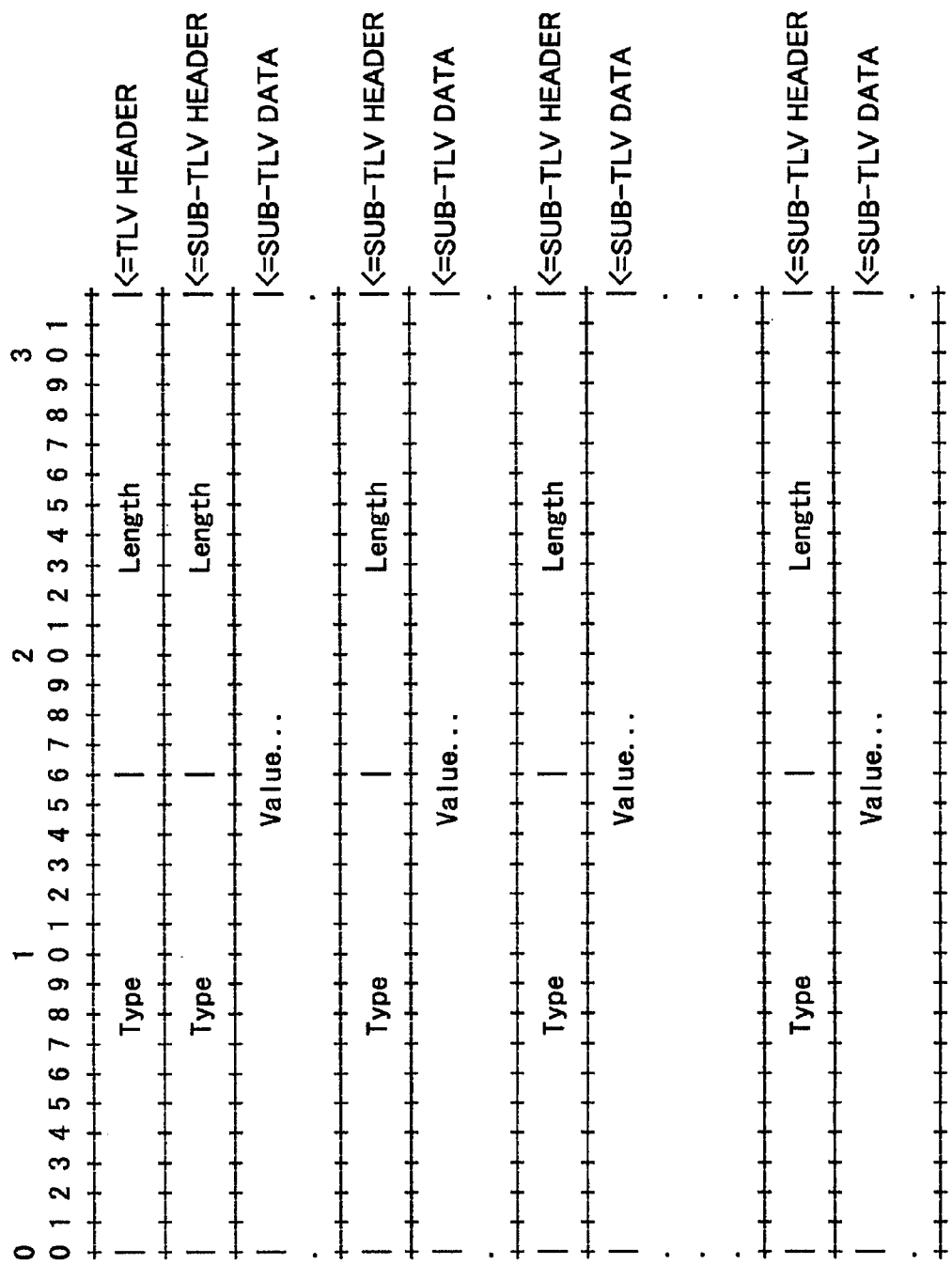
FIG. 2 is a drawing illustrating a TLV including sub-TLVs.
Figure 4:
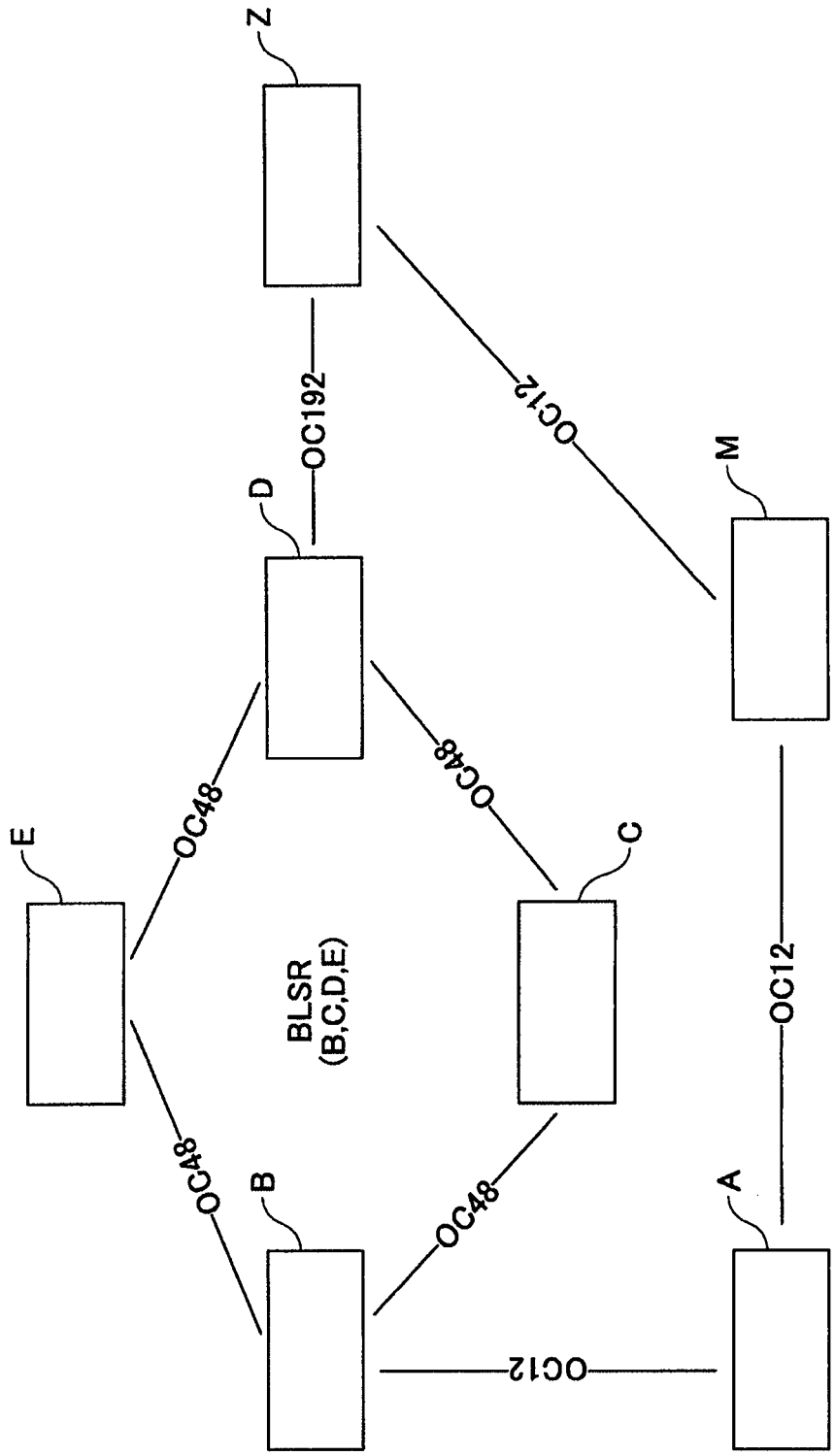
FIG. 4 is a drawing illustrating an exemplary network including a BLSR.
Figure 6:
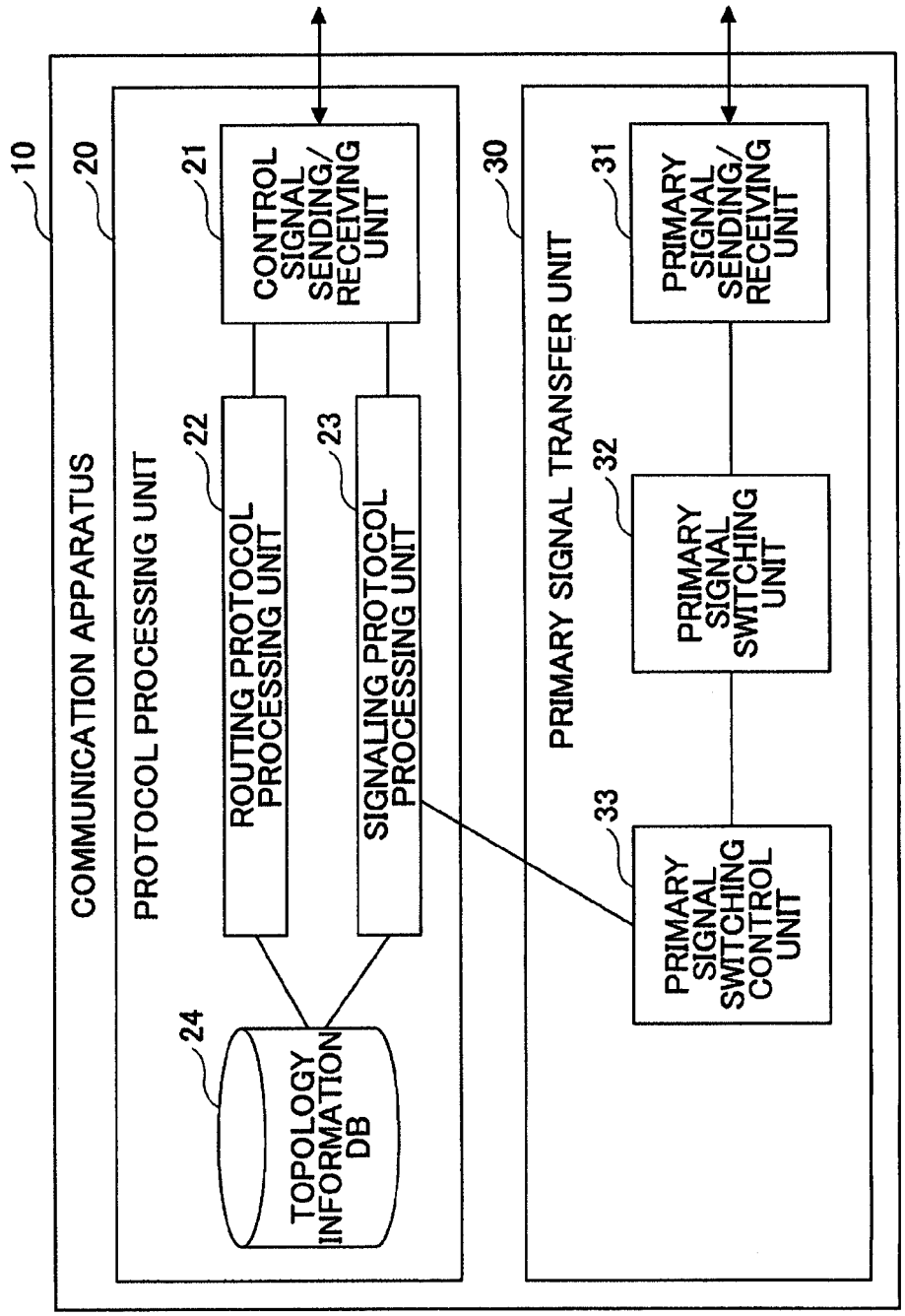
FIG. 6 is a block diagram illustrating an exemplary functional configuration of a communication apparatus 10.

FIG. 6 is a block diagram illustrating an exemplary functional configuration of a communication apparatus 10 used as nodes in the exemplary network shown in FIG. 4. The communication apparatus 10 includes a protocol processing unit 20 and a primary signal transfer unit 30. The protocol processing unit 20 performs protocol processing for setting up LSPs and includes a control signal sending/receiving unit 21, a routing protocol processing unit (link information advertising unit) 22, a signaling protocol processing unit 23, and a topology information database (topology information storing unit) 24.

The control signal sending/receiving unit 21 sends and receives control signals (e.g. IP packets) used in a routing protocol such as OSPF-TE and control signals used in a signaling protocol such as RSVP-TE. The routing protocol processing unit 22 performs processes related to a routing protocol. For example, the routing protocol processing unit 22 advertises and collects topology information, and calculates routes. The routing protocol processing unit 22 includes a link information advertising unit (not shown) that advertises link information, and a link information receiving unit (not shown) that receives advertised link information and stores the received link information in the topology information database 24. The signaling protocol processing unit 23 sets up LSPs according to a signaling protocol such as RSVP-TE. The topology information database 24 stores network topology information obtained by the routing protocol processing unit 22. The protocol processing unit 10 may be implemented by a hardware circuit or by a computer including a CPU and a memory and a program for causing the computer to perform protocol processing. Protocol processing according to embodiments of the present invention is mainly performed by the routing protocol processing unit 22.

The primary signal transfer unit 30 transfers signals through an LSP and includes a primary signal sending/receiving unit 31, a primary signal switching unit 32, and a primary signal switching control unit 33. The primary signal sending/receiving unit 31 is connected to a link (e.g. an STS line of SONET or an STM line of SDH; hereafter a link is called an STS line for descriptive purposes), and sends and receives primary signals (user data). The primary signal switching unit 32 connects STS lines and switches primary signals. The primary signal switching control unit 33 controls the primary signal switching unit 32 according to setting information specified by the signaling protocol processing unit 23.

The protocol processing unit 20 and the primary signal transfer unit 30 may be provided in the same apparatus or may be provided in separate apparatuses. When the protocol processing unit 20 and the primary signal transfer unit 30 are provided in the same apparatus, a physical interface may be provided for each of them or one physical interface may be used for both of them. When the protocol processing unit 20 and the primary signal transfer unit 30 are provided in separate apparatuses, a communication path for control signal transmission may be provided aside from a communication path for primary signals.

FIGS. 7 and 8 are tables showing exemplary topology information of the exemplary network shown in FIG. 4, which topology information is stored in the topology information database 24 of the communication apparatus 10. Information items shown in FIGS. 7 and 8 are provided for descriptive purposes and may not necessarily be consistent with each other.

As shown in FIGS. 7 and 8, the exemplary topology information includes reservable bandwidth information for each combination of the protection types (Enhanced, Unprotected, and Extra Traffic) and line types (STS1, STS3C, and STS12C) of a BLSR link, and channel availability information. For example, the topology information for the B-C link includes 12ch, STS1-12ch, STS3C-3ch, and STS12C-0ch for the protection type "Enhanced"; STS1-20ch, STS3C-6ch, and STS12C-1ch for the protection type "Unprotected; STS1-4ch, STS3C-1ch, and STS12C-0ch for the protection type "Extra traffic"; and a bitmap representing channel availability information (in the bitmap, 0 indicates that the channel is available and 1 indicates that the channel is occupied). The topology information as described above makes it possible, for example, to set up an LSP on PCA lines or an LSP on normal lines using the same type of channels.

In the exemplary topology information shown in FIGS. 7 and 8, reservable bandwidth information is provided line type by line type for each of the protection types. Alternatively, reservable bandwidth information may be provided protection type by protection type for each of the line types. For example, in this case, Enhanced-12ch, Unprotected: 20ch, and Extra Traffic-4ch are provided for the line type STS1 of the link B-C.

In the exemplary topology information, additional information (multiple protection types and multiple types of reservable bandwidth information) is provided only for links constituting the BLSR. Alternatively, additional information may be provided also for links not constituting the BLSR (e.g. A-B, A-M, and so on).

Exemplary processes of generating, sending, and receiving link information by the communication apparatus 10, i.e. each node, are described below. The exemplary topology information as shown in FIGS. 7 and 8 is obtained by each node through those processes.

<FIRST EXAMPLE>

Figure 9:
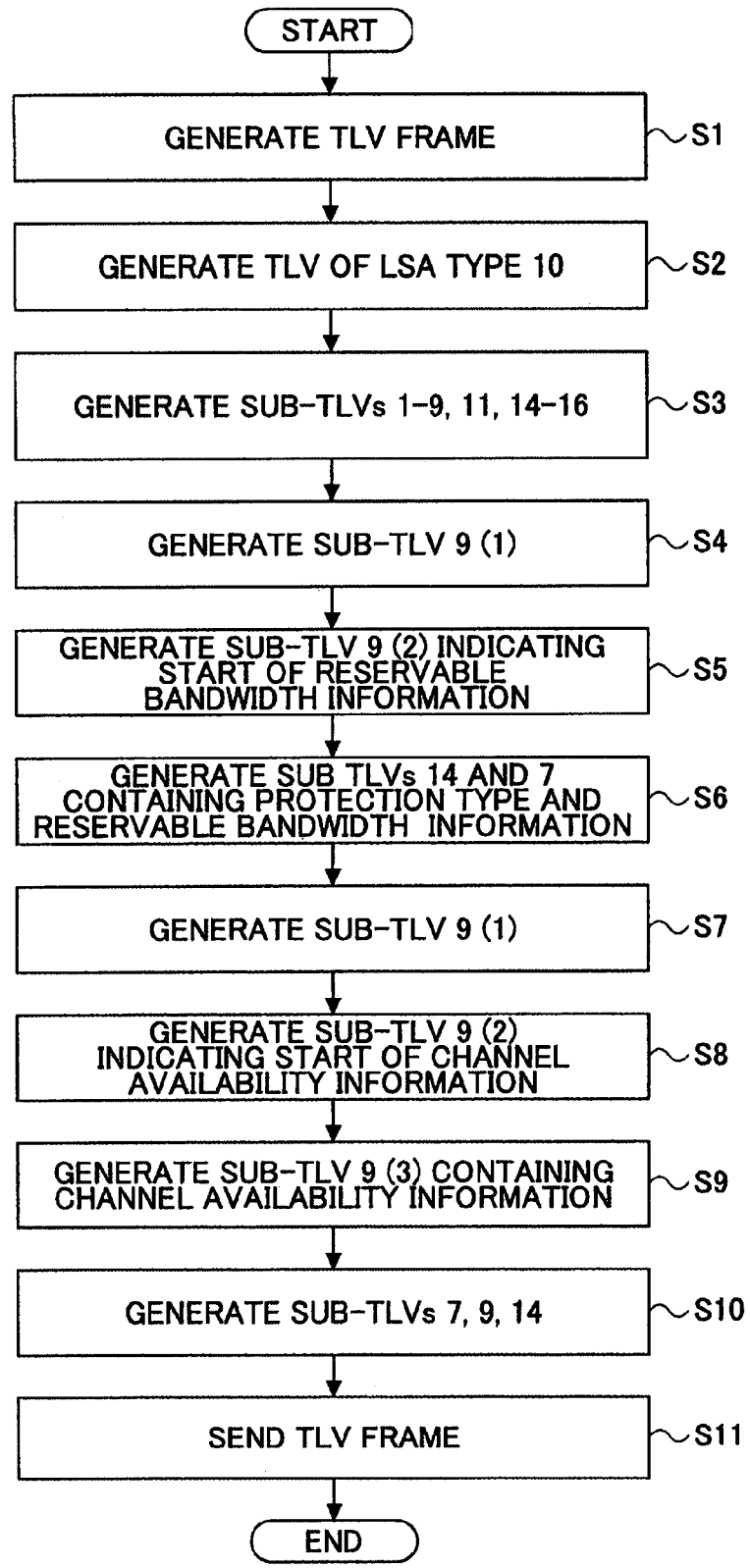
FIG. 9 is a flowchart showing a first exemplary link information sending process by the communication apparatus 10.

FIG. 9 is a flowchart showing a first exemplary link information sending process by the communication apparatus 10. This process is performed by the routing protocol processing unit 22 of the communication apparatus 10.

In step 1, the communication apparatus 10 generates a TLV frame. In step 2, the communication apparatus 10 generates a TLV of LSA type 10 (opaque LSA). In step 3, the communication apparatus 10 generates sub-TLV 1, sub-TLV 2, sub-TLV 3, sub-TLV 4, sub-TLV 5, sub-TLV 6, sub-TLV 7, sub-TLV 8, sub-TLV 9, sub-TLV 11, sub-TLV 14, sub-TLV 15, and sub-TLV 16. The number following each sub-TLV indicates the type of the sub-TLV. Steps 1 through 3 conform to the current OSPF-TE. It is not always necessary to generate all of the sub-TLVs mentioned above. In step 43, sub-TLVs required by the current OSPF-TE (mandatory sub-TLVs) and sub-TLVs necessary for the current process are generated.

Figure 10:
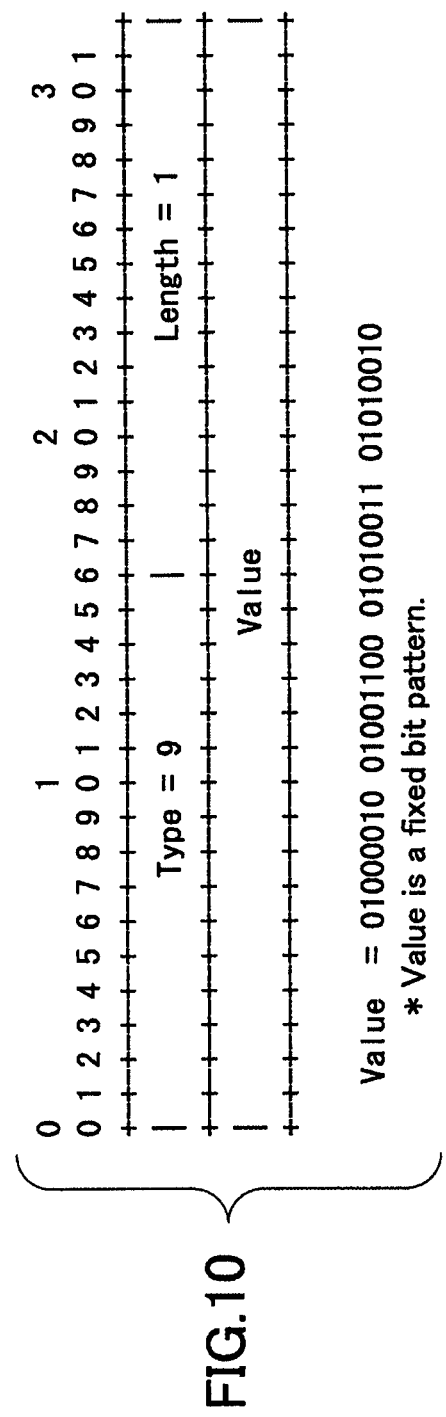
FIG. 10 is a drawing illustrating sub-TLV 9 (1)
Figure 11:
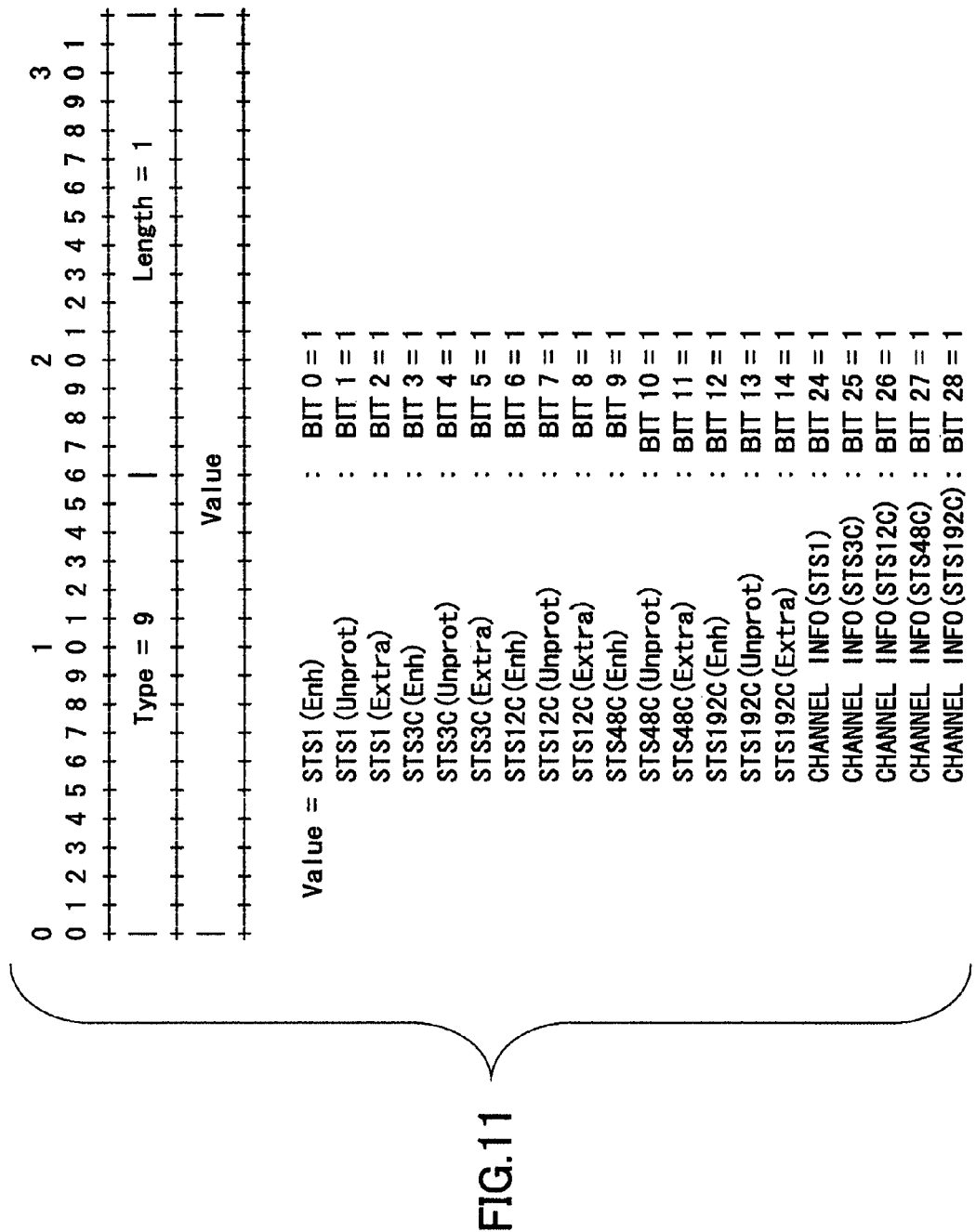
FIG. 11 is a drawing illustrating sub-TLV 9 (2)

In step 4, the communication apparatus 10 generates sub-TLV 9 (1) (the number in brackets is used to distinguish different sub-TLVs 9) and sets a fixed bit pattern as the value as shown in FIG. 10. Sub-TLV type 9 (administrative group sub-frame) is defined in the OSPF-TE as "Administrative Group". Sub-TLV 9 (1) tells the receiving node to start protocol processing of the first example. In step 5, the communication apparatus 10 generates sub-TLV 9 (2) and sets a value indicating information that follows. For example, the value of sub-TLV 9 (2) is set as shown in FIG. 11.

When bits 0 through 8 of the value are 1 and other bits are 0 (i.e. Value=111111111000000000000000000000000), it indicates that reservable bandwidth information for each combination of the line types STS1, STS3C, and STS12C and the protection types Enhanced, Unprotected, and Extra Traffic is to be sent following sub-TLV 9 (2). A pair of sub-TLVs, sub-TLV 14 and sub-TLV 7, are used to send reservable bandwidth information for each of the combinations. Sub-TLV 14 indicates a protection type and sub-TLV 7 indicates reservable bandwidth information. Therefore, the number of pairs of sub-TLVs 14 and 7 corresponds to the number of 1 s in bits 0 through 14 of sub-TLV 9 (2).

In step 6, the communication apparatus 10 generates a corresponding number of pairs of sub-TLVs 14 and 7 in sequence according to the value of sub-TLV 9 (2). The type of information contained in each of sub-TLVs 14 and 7 is compliant with the current OSPF-TE.

In steps 8 and 9, the communication apparatus 10 generates sub-TLV 9 (1) and sub-TLV 9 (2) again. The value of sub-TLV 9 (2) generated in step 8 indicates that channel availability information follows. For example, when bit 26 shown in FIG. 11 is 1, it indicates that channel availability information for 12 channels (12 bits) is to be sent.

Figure 12:
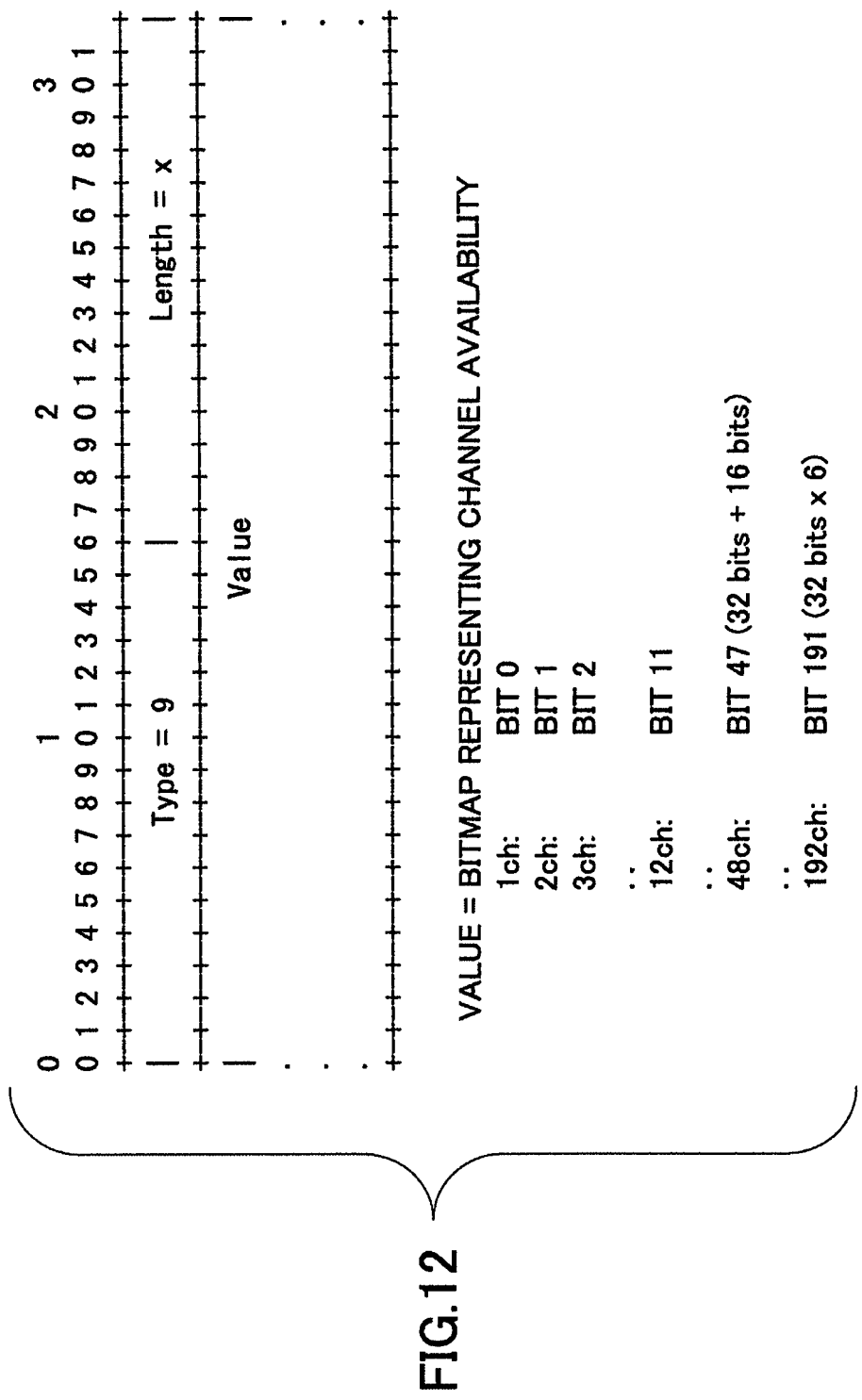
FIG. 12 is a drawing illustrating sub-TLV 9 (3)

In step 9, the communication apparatus 10 generates sub-TLV 9 (3) and sets channel availability information as the value. As shown in FIG. 12, channel availability information is represented by a bitmap each bit of which corresponds to one channel. For example, if bit 11 of the bitmap is 1, it indicates that the 12th channel is occupied.

In step 10, the communication apparatus 10 again generates sub-TLV 7, sub-TLV 9, and sub-TLV 14, which are the same as those generated in step 3. In step 11, the communication apparatus 10 sends the TLV frame containing the sub-TLVs generated in steps 3 through 10.

The descriptions below explain the reason why a set of sub-TLVs conforming to the current OSPF-TE are generated in step 3 and sub-TLVs 7, 9, and 14 conforming to the current OSPF-TE are generated again in step 10.

In the current OSPF-TE, a node does not receive two or more sub-TLVs of the same type. Therefore, if a conventional communication apparatus conforming to the current OSPF-TE receives two or more sub-TLVs of the same type, the apparatus may handle the sub-TLVs in one of the following manners (a) and (b):

(a) Trusts the first one of the received sub-TLVs of the same type and discards the rest of them.

(b) Trusts the last one of the received sub-TLVs of the same type and discards the rest of them; or repeats a process of overwriting a preceding sub-TLV by a succeeding sub-TLV of the same type and thereby keeps the last one of the received sub-TLVs of the same type.

Sending a set of sub-TLVs conforming to the current OSPF-TE in step 3 makes it possible for a conventional communication apparatus of type (a) to correctly handle a TLV sent from the communication apparatus 10 of this embodiment. Sending sub-TLVs 7, 9, and 14 conforming to the current OSPF-TE again in step 10 makes it possible for a conventional communication apparatus of type (b) to correctly handle a TLV sent from the communication apparatus 10 of this embodiment.

Thus, the exemplary link information sending method shown in FIG. 9 can be used in a network including both conventional communication apparatuses not supporting a protocol of this embodiment and communication apparatuses supporting the protocol.

Figure 13:
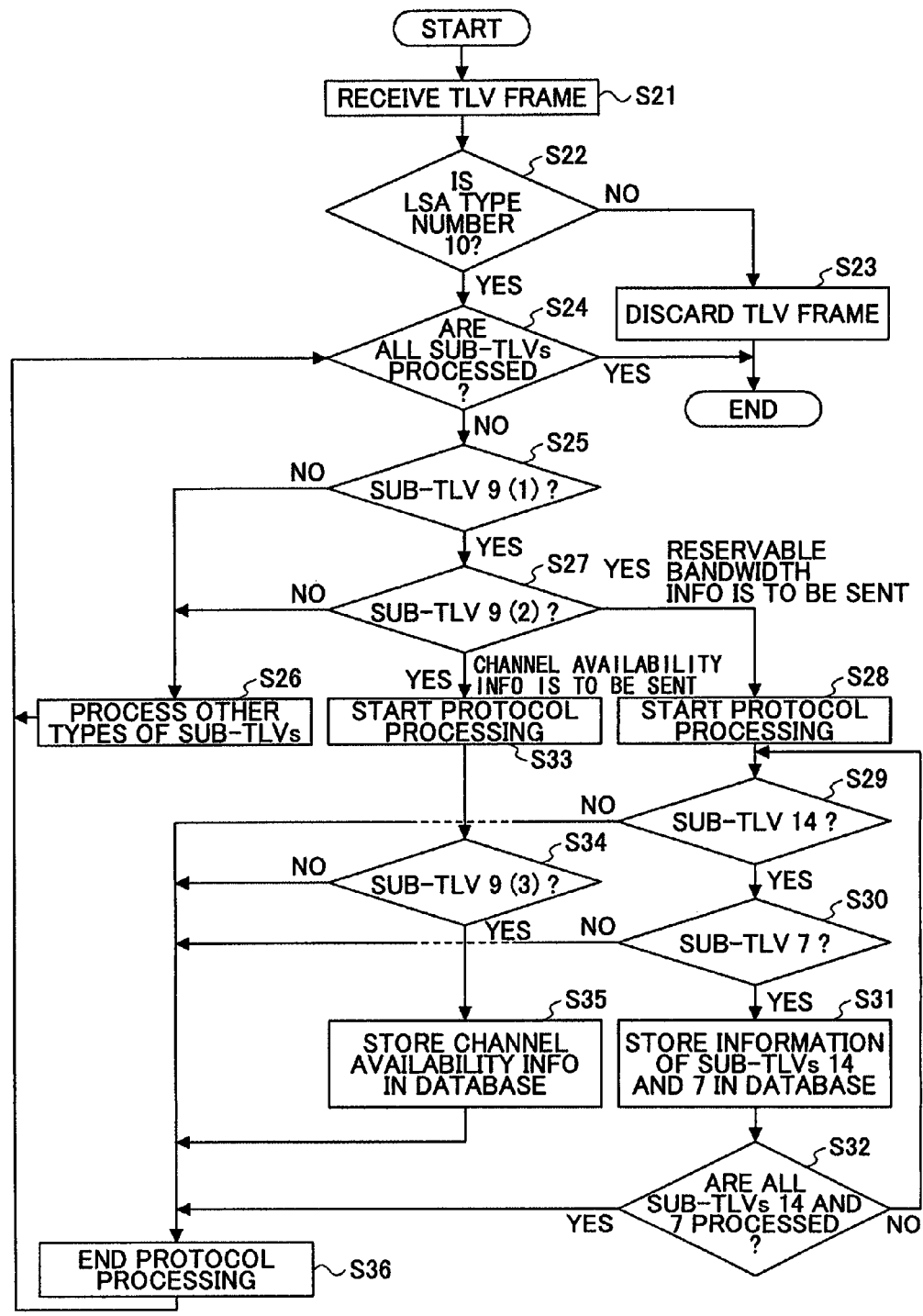
FIG. 13 is a flowchart showing a first exemplary link information receiving process by the communication apparatus 10.

FIG. 13 is a flowchart showing a first exemplary link information receiving process by the communication apparatus 10.

In step 21, the communication apparatus 10 receives a TLV frame from another communication apparatus. Then, in step 22, the communication apparatus 10 determines whether the LSA type number in the received TLV frame is 10 (opaque LSA). If the LSA type number is not 10 in step 22, i.e., if the received link information is not for GMPLS, the communication apparatus 10 discards the received TLV frame in step 23.

If the LSA type number is 10 in step 22, the communication apparatus 10 processes the sub-TLVs in the TLV frame in sequence through step 24 and subsequent steps. In the descriptions below, a sub-TLV currently being processed is called the current sub-TLV.

If the current sub-TLV is not sub-TLV 9 (1) in step 25, i.e., if the type number of the current sub-TLV is not 9 and/or the value is not identical with that shown in FIG. 10, the communication apparatus 10 performs a corresponding process for the current sub-TLV in step 26. If the current sub-TLV is sub-TLV 9 (1) in step 25, the communication apparatus 10 determines whether the next sub-TLV is sub-TLV 9 (2) in step 27. In other words, the communication apparatus 10 determines whether the type number of the next sub-TLV is 9 and the value conforms to the format shown in FIG. 11.

If the next sub-TLV is not sub-TLV 9 (2) in step 27, the communication apparatus 10 performs a corresponding process for the next sub-TLV in step 26. If the next sub-TLV is sub-TLV 9 (2) in step 27, the communication apparatus 10 reads the value of sub-TLV 9 (2), thereby determines whether subsequent information is reservable bandwidth information or channel availability information, and starts corresponding protocol processing in step 28 or 33. Here, "protocol processing" indicates a process of analyzing sub-TLVs and obtaining reservable bandwidth information or channel availability information.

Assuming that the TLV frame is generated as described with reference to FIG. 9, sub-TLV 9 (2) indicates that reservable bandwidth information for each combination of line types and protection types is contained in subsequent sub-TLVs. Therefore, the communication apparatus 10 proceeds to step 28 and starts the corresponding protocol processing. In the subsequent step 29, the communication apparatus 10 determines whether the type number of the next sub-TLV is 14 (Link Protection Type). If the type number is not 14, the communication apparatus 10 returns to step 24. If the type number is 14 in step 29, the communication apparatus 10 determines whether the type number of the next sub-TLV is 7 (Maximum Reservable Bandwidth) in step 30. If the type number is not 7, the communication apparatus 10 returns to step 24.

If the type number is 7 in step 30, the communication apparatus 10, in step 31, obtains the protection type in sub-TLV 14 and the reservable bandwidth information in sub-TLV 7, and stores them in the topology information database 24 in association with a link corresponding to the received TLV frame. For example, when the communication apparatus 10 is node B shown in FIG. 4 and the received TLV frame contains information on the link E-D, the protection type and the reservable bandwidth information are associated with the link E-D and stored in the topology information database 24.

In step 32, the communication apparatus 10 determines whether all pairs of sub-TLVs 14 and 7 have been processed according to the value of sub-TLV 9 (2) identified in step 27. If NO in step 32, the communication apparatus 10 repeats steps 29 through 31 and stores the protection types and the reservable bandwidth information as described above. If YES in step 32, the communication apparatus 10 returns to step 24. Alternatively, step 32 may be omitted and the communication apparatus 10 may be configured to exit the loop of steps 29 through 31 when it cannot find sub-TLV 14 or sub-TLV 7.

In step 24, the communication apparatus 10 determines whether all sub-TLVs have been processed. If NO in step 24, the communication apparatus 10 tries to find sub-TLV 9 (1) and sub-TLV 9 (2) in steps 25 and 27. Since the TLV frame of this example is generated as shown in FIG. 9, the communication apparatus 10 finds sub-TLV (1) in step 25 and sub-TLV (2) in step 27. The value of sub-TLV (2) found in step 27 indicates that channel availability information is to be sent.

The communication apparatus 10 starts protocol processing in step 33 and determines whether the next sub-TLV is sub-TLV 9 (3) in step 34. If the next sub-TLV is not sub-TLV 9 (3), the communication apparatus 10 returns to step 24. If the next sub-TLV is sub-TLV 9 (3), the communication apparatus 10 obtains the channel availability information in sub-TLV 9 (3) and stores the information in association with the corresponding link in the topology information database 24 in step 35. Then, the communication apparatus 10 returns to step 24 and processes the remaining sub-TLVs.

<SECOND EXAMPLE>

Figure 14:
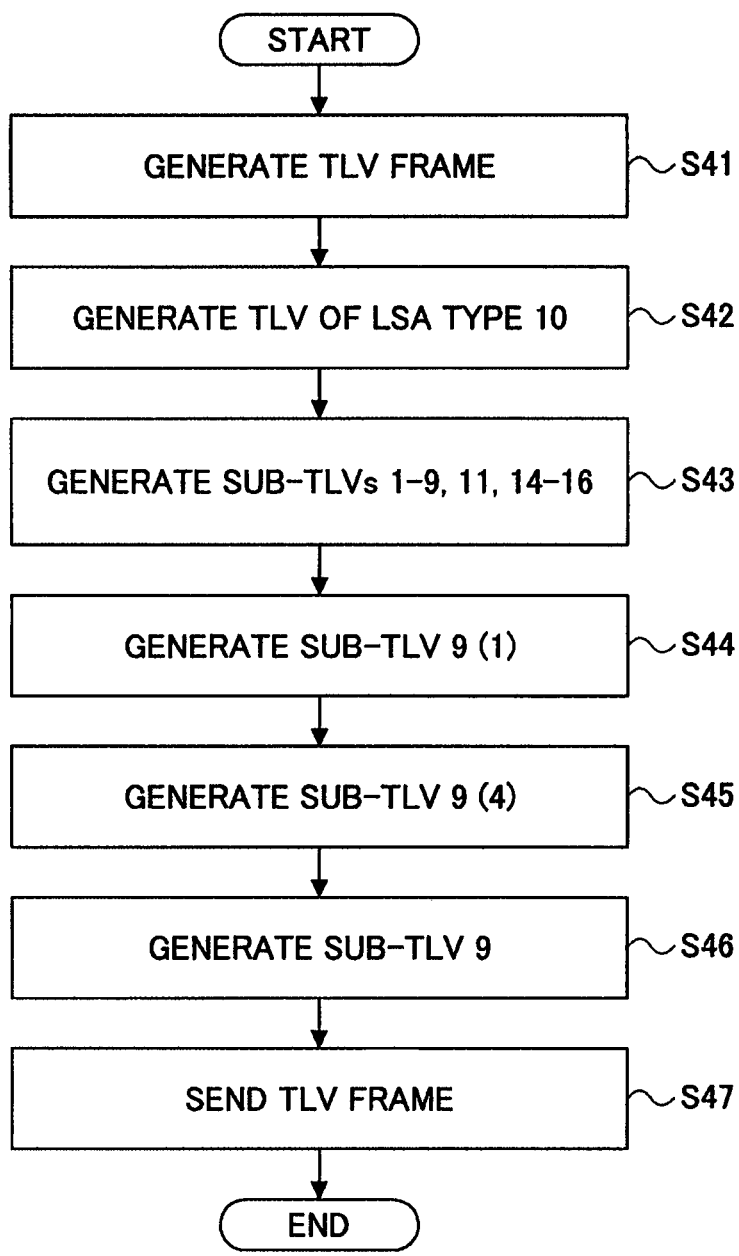
FIG. 14 is a flowchart showing a second exemplary link information sending process by the communication apparatus 10.

A second exemplary link information sending process and a second exemplary link information receiving process by the communication apparatus 10 are described below. FIG. 14 is a flowchart showing a second exemplary link information sending process by the communication apparatus 10.

In step 41, the communication apparatus 10 generates a TLV frame. In step 42, the communication apparatus 10 generates a TLV of LSA type 10 (opaque LSA). In step 43, the communication apparatus 10 generates sub-TLV 1, sub-TLV 2, sub-TLV 3, sub-TLV 4, sub-TLV 5, sub-TLV 6, sub-TLV 7, sub-TLV 8, sub-TLV 9, sub-TLV 11, sub-TLV 14, sub-TLV 15, and sub-TLV 16. As in the first example, steps 41 through 43 conform to the current OSPF-TE. It is not always necessary to generate all of the sub-TLVs mentioned above. In step 43, sub-TLVs required by the current OSPF-TE and necessary for the current process are generated.

In step 44, as in step 4 of the first example, the communication apparatus 10 generates sub-TLV 9 (1) containing a fixed bit pattern telling the receiving node to start protocol processing. In step 45, the communication apparatus 10 generates sub-TLV 9 (4) containing reservable bandwidth information for each combination of line types and protection types and a bitmap representing channel availability information.

Figure 15:
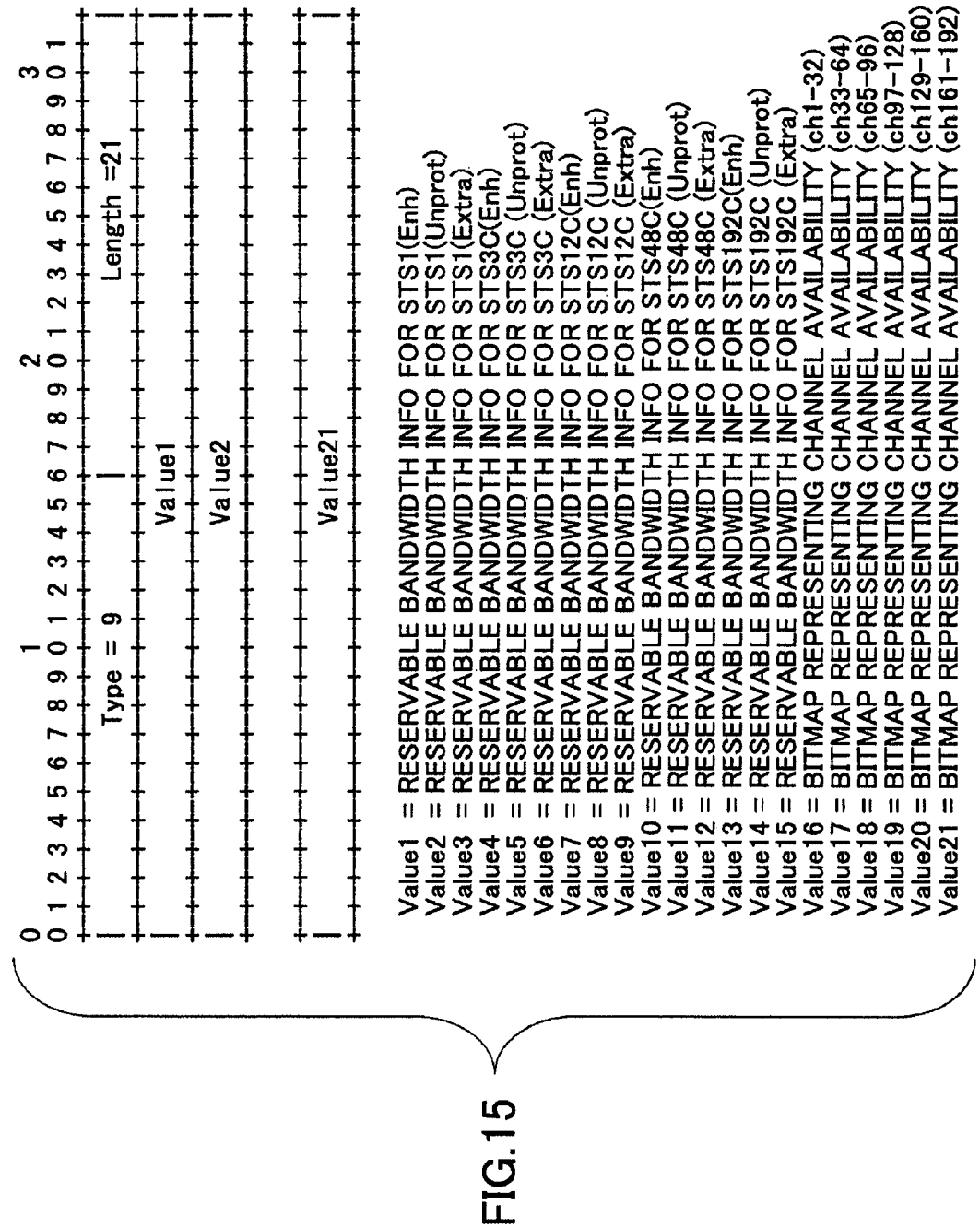
FIG. 15 is a drawing illustrating sub-TLV 9 (4)

FIG. 15 is a drawing illustrating sub-TLV 9 (4). As shown in FIG. 15, sub-TLV 9 (4) contains values 1 through 15 corresponding to reservable bandwidth information for combinations of line types and protection types, and values 16 through 21 corresponding to bitmaps representing channel availability information.

In step 46, the communication apparatus 10 again generates sub-TLV 9, which is the same as that generated in step 43. Then, in step 47, the communication apparatus 10 sends the TLV frame containing the sub-TLVs generated in steps 43 through 46.

The reason why a set of sub-TLVs conforming to the current OSPF-TE are generated in step 43 and the same sub-TLV 9 is generated again in step 46 is substantially the same as explained in the first example.

Figure 16:
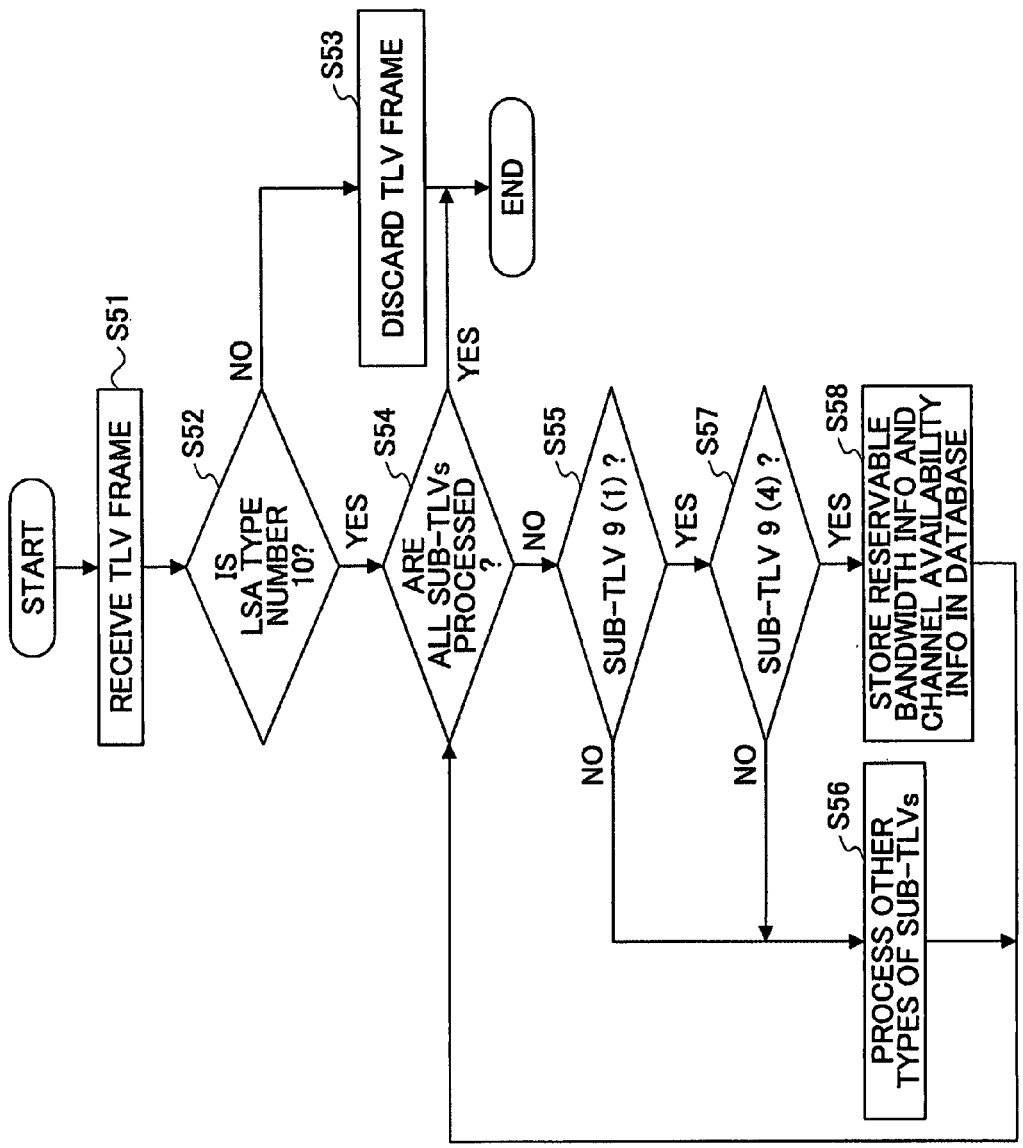
FIG. 16 is a flowchart showing a second exemplary link information receiving process by the communication apparatus 10.

FIG. 16 is a flowchart showing a second exemplary link information receiving process by the communication apparatus 10.

The communication apparatus 10 receives a TLV frame from another communication apparatus in step 51 and determines whether the LSA type number in the received TLV frame is 10 (opaque LSA) in step 52. If the LSA type number is not 10 in step 52, i.e., if the received link information is not for GMPLS, the communication apparatus 10 discards the received TLV frame in step 53.

If the LSA type number is 10 in step 52, the communication apparatus 10 processes the sub-TLVs in the TLV frame in sequence through step 54 and subsequent steps. In step 55, the communication apparatus 10 determines whether the current sub-TLV is sub-TLV 9 (1). If the current sub-TLV is not sub-TLV 9 (1) in step 55, the communication apparatus 10 performs a corresponding process for the current sub-TLV in step 56. If the current sub-TLV is sub-TLV 9 (1) in step 55, the communication apparatus 10 determines whether the next sub-TLV is sub-TLV 9 (4) in step 57. If the next sub-TLV is not sub-TLV 9 (4), the communication apparatus 10 performs a corresponding process for the next sub-TLV in step 56. If the next sub-TLV is sub-TLV 9 (4), the communication apparatus 10 obtains the reservable bandwidth information and the channel availability information in sub-TLV 9 (4) and stores the information in association with the corresponding link in the topology information database 24 in step 58. Then, the communication apparatus 10 returns to step 54 and processes the remaining sub-TLVs.

The main difference between the first and second examples is in the use of sub-TLV 9. Sub-TLV 9 is originally designed for various uses and can contain data of variable length. Using this characteristic of sub-TLV 9, both reservable bandwidth information and channel availability information are packed into sub-TLV 9 (4) in the second example. On the other hand, in the first example, sub-TLV 9 (2) is used as a marker indicating the information that follows, the protection type and the reservable bandwidth information are sent using sub-TLVs 14 and 7, and the channel availability information is sent using sub-TLV 9 (3). The type of information contained in each of sub-TLVs 14 and 7 is compliant with the current OSPF-TE. In other words, in the first example, sub-TLVs 14 and 7 are used for their original purposes. Also, since sub-TLV 9 (2) is used just as a marker and sub-TLV 9 (3) is used to send only channel availability information, their sizes are small compared to the size of sub-TLV 9 (4) used in the second example. With the methods described in the first and second examples, substantially the same topology information as shown in FIGS. 7 and 8 can be obtained.

An embodiment of the present invention makes it possible to advertise link information that is used to build topology information of a network and includes, for each of the protection types of a link, information used to set up a path. This in turn makes it possible to set up a path based on the topology information taking into account the protection types of a link.

An embodiment of the present invention makes it possible to advertise reservable bandwidth information for each combination of protection types and line types of a link, and channel availability information indicating availability of channels of lines provided by the link.

Embodiments of the present invention make it possible to send and receive network topology information including redundancy information and thereby make it possible to flexibly set up a path taking into account line types and protection types.

The present invention is not limited to the specifically disclosed embodiments, and variations and modifications may be made without departing from the scope of the present invention.

What is claimed is:

1. A communication apparatus, comprising:
 a protocol processing unit configured to send and receive link information on a link in a network having a redundant configuration according to a protocol, to build topology information of the network from the link information, and to set up a path in the network based on the topology information;
 wherein the protocol processing unit includes
 a link information advertising unit configured to advertise the link information including information used to set up the path, said information used to set up the path including reservable bandwidth information for each of a plurality of line types of lines provided by the link with respect to each of a plurality of protection types of the link;

a topology information storing unit configured to store the topology information; and a link information receiving unit configured to receive the link information and to store the received link information in the topology information storing unit, wherein said information used to set up the path further includes channel availability information indicating availability with respect to each of a plurality of channels of the lines, wherein the protocol is a routing protocol for GMPLS;

the link information advertising unit is configured to use a frame defined in the routing protocol and containing sub-frames to advertise the link information; and the link information advertising unit is configured to use a protection type sub-frame to advertise each of the protection types of the link, a reservable bandwidth sub-frame to advertise the reservable bandwidth information for each of the line types with respect to each of the protection types of the link, and an administrative group sub-frame to advertise the channel availability information, wherein the link information advertising unit is configured to place mandatory sub-frames required by the routing protocol in the frame, to place the sub-frames used to advertise the protection types, the reservable bandwidth information for each of the line types with respect to each of the protection types of the link, and the channel availability information after the mandatory sub-frames, and to place the administrative group sub-frame, the protection type sub-frame, and the reservable bandwidth sub-frame that are the same as those included in the mandatory sub-frames again after the sub-frames used for the advertisement.

2. The communication apparatus as claimed in claim 1, wherein the link information advertising unit is configured to use another administrative group sub-frame as a marker indicating that the protection type sub-frame and the reservable bandwidth sub-frame are to follow.

3. The communication apparatus as claimed in claim 1, wherein the redundant configuration is implemented by a BLSR of SDH or SONET.

4. The communication apparatus as claimed in claim 1, wherein the channel availability information comprises a bitmap indicating, with respect to each of the channels, whether the channel is available or occupied.

5. A communication apparatus, comprising:

a protocol processing unit configured to send and receive link information on a link in a network having a redundant configuration according to a protocol, to build topology information of the network from the link information, and to set up a path in the network based on the topology information;

wherein the protocol processing unit includes a link information advertising unit configured to advertise the link information including information used to set up the path, said information used to set up the path including reservable bandwidth information for each of a plurality of line types of lines provided by the link with respect to each of a plurality of protection types of the link;

a topology information storing unit configured to store the topology information; and a link information receiving unit configured to receive the link information and to store the received link information in the topology information storing unit, wherein said information used to set up the path further includes channel availability information indicating availability with respect to each of a plurality of channels of the lines, wherein the protocol is a routing protocol for GMPLS;

the link information advertising unit is configured to use a frame defined in the routing protocol and containing sub-frames to advertise the link information; and the link information advertising unit is configured to use an administrative group sub-frame to advertise the channel availability information and the reservable bandwidth information for each of the line types with respect to each of the protection types of the link, wherein the link information advertising unit is configured to place mandatory sub-frames required by the routing protocol in the frame, to place the sub-frame used to advertise the channel availability information and the reservable bandwidth information for each of the line types with respect to each of the protection types of the link after the mandatory sub-frames, and to place the administrative group sub-frame that is the same as that included in the mandatory sub-frames again after the sub-frame used for the advertisement.

6. The communication apparatus as claimed in claim 5, wherein the redundant configuration is implemented by a BLSR of SDH or SONET.

7. The communication apparatus as claimed in claim 5, wherein the channel availability information comprises a bitmap indicating, with respect to each of the channels, whether the channel is available or occupied.

8. A method of sending and receiving link information on a link in a network having a redundant configuration according to a protocol, where the link information is used to build topology information of the network and the topology information is used to set up a path in the network, the method comprising:

advertising, by a processor, the link information including information used to set up the path, said information used to set up the path including reservable bandwidth information for each of a plurality of line types of lines provided by the link with respect to each of a plurality of protection types of the link; and receiving, by the processor, the link information and storing the received link information in a database to build the topology information, wherein said information used to set up the path further includes channel availability information indicating availability with respect to each of a plurality of channels of the lines, wherein the protocol is a routing protocol for GMPLS; and said advertising the link information includes using a frame defined in the routing protocol and containing sub-frames to advertise the link information;

using a protection type sub-frame to advertise each of the protection types of the link;

using a reservable bandwidth sub-frame to advertise the reservable bandwidth information for each of the line types with respect to each of the protection types of the link; and using an administrative group sub-frame to advertise the channel availability information, wherein said advertising the link information includes placing mandatory sub-frames required by the routing protocol in the frame;

placing the sub-frames used to advertise the protection types, the reservable bandwidth information for each of the line types with respect to each of the protection types of the link, and the channel availability information after the mandatory sub-frames; and placing the administrative group sub-frame, the protection type sub-frame, and the reservable bandwidth sub-frame that are the same as those included in the mandatory sub-frames again after the sub-frames used for the advertisement.

9. The method as claimed in claim 8, wherein said advertising the link information includes using another administrative group sub-frame as a marker indicating that the protection type sub-frame and the reservable bandwidth sub-frame are to follow.

10. The method as claimed in claim 8, wherein the redundant configuration is implemented by a BLSR of SDH or SONET.

11. The method as claimed in claim 8, wherein the channel availability information comprises a bitmap indicating, with respect to each of the channels, whether the channel is available or occupied.

12. A method of sending and receiving link information on a link in a network having a redundant configuration according to a protocol, where the link information is used to build topology information of the network and the topology information is used to set up a path in the network, the method comprising:

advertising, by a processor, the link information including information used to set up the path, said information used to set up the path including reservable bandwidth information for each of a plurality of line types of lines provided by the link with respect to each of a plurality of protection types of the link; and receiving, by the processor, the link information and storing the received link information in a database to build the topology information, wherein said information used to set up the path further includes channel availability information indicating availability with respect to each of a plurality of channels of the lines, wherein the protocol is a routing protocol for GMPLS; and said advertising the link information includes using a frame defined in the routing protocol and containing sub-frames to advertise the link information; and using an administrative group sub-frame to advertise the channel availability information and the reservable bandwidth information for each of the line types with respect to each of the protection types of the link, wherein said advertising the link information includes placing mandatory sub-frames required by the routing protocol in the frame;

placing the sub-frame used to advertise the channel availability information and the reservable bandwidth information for each of the line types with respect to each of the protection types of the link after the mandatory sub-frames; and placing the administrative group sub-frame that is the same as that included in the mandatory sub-frames again after the sub-frame used for the advertisement.

13. The method as claimed in claim 12, wherein the redundant configuration is implemented by a BLSR of SDH or SONET.

14. The method as claimed in claim 12, wherein the channel availability information comprises a bitmap indicating, with respect to each of the channels, whether the channel is available or occupied.

\* \* \* \* \*